Patented Dec. 8, 1942

2,304,125

UNITED STATES PATENT OFFICE 2,304,125

EMULSION AND DISPERSION

Richard S. Shutt and Ellsworth E. McSweeney, Upper Arlington, Ohio, assignors to Kendall Refining Company, Bradford, Pa., a corporation of Pennsylvania No Drawing. Application August 3, 1940, Serial No. 351,109

11 Claims. (Cl. 252—306)

This invention relates to certain improvements in the art of aqueous emulsions and dispersions.

More specifically, the invention contemplates the provision of improved emulsions and dispersions from certain derivatives of a relatively high boiling paraffin base oil product that has not been subjected to thermal decomposition or chemical change beyond that induced by ordinary distillation; emulsions and dispersions of combinations of such paraffin base oil derivatives; and emulsions of combinations of such materials and compatible substances such as drying oils, gilsonite, coal tar pitch, coumarone-indene resins, phenol-formaldehyde resins, nitrocellulose, ethyl cellulose, chlorinated rubber and the like, as well as blended emulsion products.

The paraffin base oil derivatives which are contemplated for use in producing the novel emulsions of the present invention may be generally subdivided into three groups.

Group 1 comprises high molecular weight viscous materials precipitated from a warm hydrocarbon solvent solution of a relatively high boiling paraffin base oil product that has neither been subjected to thermal decomposition or chemical change other than occasioned by ordinary atmospheric pressure or vacuum distillation. "Hydrocarbon solvent," as above used, is intended to embrace those hydrocarbon solvents which are gaseous at normal temperature and which have from two to four carbon atoms per molecule. By "precipitation from a warm solution" is meant precipitation from a solution at a temperature above 77° F. and below the critical temperature of the solvent.

As more specifically illustrative of derivatives of paraffin base oil of group 1 may be given the high molecular weight naturally contained viscous material precipitated from a warm propane solution of a distillation residue such as a cylinder stock residue of a paraffin base oil containing substantially no more than 0.2% asphaltic-like material by the Holde method.

This group also embraces chemical condensation products of the precipitated naturally contained high molecular weight viscous material referred to above.

Group 2 comprises the solvent-free extracts removed by extraction of the paraffin base oil product from which the naturally contained viscous materials of group 1, as well as the wax content of the oil, have been removed.

The solvent herein referred to may be one usually regarded as capable of concentrating the aromatic constituents in the extract phase. Typically exemplary of such solvents are anhydrous and aqueous phenol, though extracts obtained through the medium of other selective solvents are within the broad contemplation of the present invention.

Group 3 comprises combinations and admixtures of the various materials of group 1 and combinations thereof with the materials of group 2, as well as combinations of the various materials of groups 1 and 2 with compatible substances.

To the end that the identity of the materials of the several groups herein contemplated may be clearly appreciated, the specific manner of production of the materials of groups 1 and 2 will be set forth:

The typical materials of group 1 may be obtained in accordance with the following procedure:

While reference will be made more particularly to the use of propane in obtaining the materials of group 1 of the present invention, it is to be understood that other hydrocarbon precipitants, e. g., normally gaseous hydrocarbons of from two to four carbon atoms may likewise be used, and that propane is referred to as the preferred embodiment of the invention.

An exemplification of a preferred procedure for obtaining illustrative group 1 materials for use in accordance with the invention, is as follows:

A so-called "cylinder stock" or similar normal or vacuum distillation residual stock from a paraffin base crude, is charged to a propane dewaxing operation. The specific character of the charge will depend somewhat on the viscosity and pour point of the ultimately desired oil product of the propane treatment. For example, if it is the purpose of the propane treatment to obtain a so-called "bright stock" having a S. S. U. viscosity of 150 at 210° F. a cylinder stock charging material will have approximately the following specifications:

Viscosity _____ 175 S. S. U. at 210° F.
Optical density (color)____ 2800
A. P. I. gravity_____ 25.6
Conradson carbon residue_ 2.6%
Flash (Cleveland open cup) 565° F.

Where a bright stock having a viscosity at

210° F. of 120 S. S. U. and a zero pour point is the desired oil product of the propane treatment, the cylinder stock charge will have approximately the following specifications:

Viscosity _____ 165 S. S. U. at 210° F.
Optical density (color)____ 2700
A. P. I. gravity_____ 25.8
Conradson carbon residue_ 2.25%
Flash (Cleveland open cup) 560° F.

Such a cylinder stock charging material is preferably subjected to propane treatment in the following manner.

The charging stock is mixed with propane and fed into a warm solution tank at a temperature of approximately 65° F. The cylinder stock propane solution is then transferred into a chiller and the pressure reduced until a temperature of the order of −20 to −54° F. is obtained depending upon the desired pour point of the ultimate oil product. The chilling is effected by evaporation of propane in the well recognized manner and make up propane is added during the chilling operation so that a ratio of propane to oil of approximately three to one prevails at the end of the chilling cycle and at the time of filtration.

When the cylinder stock-propane solution has been sufficiently chilled it is transferred to a filter feed tank and thence to an appropriate filter to secure separation of the wax from the chilled solution.

The propane oil solution which has been freed from wax in the filter is then subjected to a precipitating treatment in which propane is added until the propane oil ratio is raised to approximately eight to one and the temperature of this solution is elevated to a temperature above 77° F. and preferably to a temperature of approximately the order of 155° to 165° F., which results in the precipitation of high molecular weight naturally contained viscous materials.

While in the above exemplification, the solvent dewaxing is described as occurring in advance of the precipitation from the warm hydrocarbon solution, it is desired to point out that the precipitation step may be effected in advance of dewaxing without materially modifying the character of the precipitate. In fact, in some instances, the initial precipitation from the warm solvent solution may be preferred particularly where wax separation is effected by centrifuging.

The precipitated material, separated from the warm propane solution, either before or after dewaxing of the cylinder stock, may advantageously be subjected to further treatment to separate the same into relatively higher and lower viscosity materials.

Specifically, when employing a warm propane solution of the paraffin base oil product having a temperature of the order of 160° F., the precipitate may be further separated into a series of different viscosity products by first adding propane and lowering the temperature to about 80° F., whereupon the higher viscosity materials separate; i. e., those having a viscosity at 210° F. of from 3000 to 5000 S. S. U., and thereafter progressively raising the temperature to approximately 160° F. with successive separation of materials ranging in viscosity from approximately 2000 S. S. U. at 210° F., down to approximately 400 S. S. U. at 210° F.

These thus precipitated materials and similar materials, precipitated from hydrocarbon solvent solutions other than a propane solution, represent high molecular weight naturally contained hydrocarbons of the paraffin base oil fraction from which they have been precipitated, the paraffin base oil being characterized in that it has a content of not substantially in excess of 0.2% of asphaltic like materials (Holde method).

These natural high molecular weight high viscosity hydrocarbon materials which have undergone no thermal decomposition or chemical change other than occasioned by normal or vacuum distillation may in some adaptations of the present invention be directly employed as the materials of group 1.

For other specific adaptations of the present invention, it has been found desirable to employ chemical condensation products of these natural high molecular weight viscous hydrocarbon components of the paraffin base oil fraction. Such condensation products may advantageously be produced by air blowing the natural high molecular weight viscous materials under controlled temperature conditions.

Air blowing of the source materials results in an exothermic reaction thus rendering the process at least partially self-sustaining without application of further extraneous heat, although it may be necessary to add extraneous heat, depending upon the source material being treated and the design of the particular vessel in which the air blowing operation is carried on. The rate of air blowing is so controlled as to maintain the temperature at approximately 400 to 575° F.

The mechanism of the chemical condensation of the complex natural viscous materials precipitated from warm hydrocarbon solutions of the paraffin base oils is not fully understood but is believed to be induced by the presence of air due to oxygen being taken up by certain of the molecules, after which molecules are condensed with a splitting off of water to yield a higher molecular weight chemically condensed product. These products may, for convenience, be termed "polymers," but it is to be understood that such designation is not intended to signify that they have resulted wholly from the union of like molecular structures.

The following represent typical illustrations for the production of group 1 materials contemplated for use in producing emulsions and dispersions in accordance with the instant invention.

(a) A natural high molecular weight viscous precipitate was derived from a paraffin base cylinder stock in the manner hereinabove outlined, and represents the heavier molecular weight portion separated from the overall warm propane solution precipitates at a temperature of approximately 80° F.

These natural occurring precipitated materials had the following properties:

Visc. S. S. U. at 210° F_____ 5250
Penetration 100 g. total wt. (A. S. T. M. D5-25) cm.×10$^{-2}$_____ Too soft to give a reading
Ball & ring softening point (A. S. T. M. D36-26) °F_____ Below 80° F.
Molecular wt. (avg.)_____ 1380
Iodine No. Wijs method_____ 57
Carbon atoms per double bond (avg.) _____ 32

Starting with this source material, the same was charged to a suitable apparatus for air blowing and initially heated to a temperature of approximately 500° F. accompanied by the introduction of air.

Care was exercised to avoid elevation of the temperature to a degree that would cause flashing. The air blowing in this case was conducted for approximately two hours with the temperature maintained within the range of from 480 to 500° F. This operation resulted in the production of a condensation product having the following characteristics:

Visc. S. S. U. at 210° F____ Too viscous for ready determination
Penetration 100 g. total wt.
(A. S. T. M. D5–25)
cm.×10$^{-2}$ _____ 101
Ball & ring softening point
(A. S. T. M. D36–26) °F__ 115° F.
Molecular weight average__ 1900
Iodine No. Wijs method____ 41
Carbon atoms per double
bond (avg.) _____ 44

It is to be noted that this product possessed a lower iodine number, a lower penetration, a higher softening point, and a much higher molecular weight than did the source material from which it was derived by condensation in the presence of air.

(b) The same viscous source material was used as in illustration a. The air blowing was conducted under conditions similar to those in illustration a except that the air blowing was continued for a period of approximately nine hours. The resulting condensation product was found to possess the following characteristics:

Visc. S. S. U. at 210° F____ Too viscous for ready determination
Penetration 100 g. total wt.
(A. S. T. M. D5–25)
cm.×10$^{-2}$ _____ 23
Ball & ring softening point
(A. S. T. M. D36–26) °F__ 218°
Molecular weight average_ 2130
Iodine No. Wijs method___ 39
Carbon atoms per double
bond (avg.) _____ 46

(c) The source material for this operation differed somewhat from the source materials of illustrations a and b above in that it constituted a less viscous portion of the material which had been separated from the overall warm propane precipitate at a temperature of approximately 150° F. This somewhat less viscous source material had the following characteristics:

Visc. S. S. U. at 210° F_____ 746
Penetration 100 g. total wt. (A. S.
T. M. D5–25) cm.×10$^{-2}$_____ Too soft to give a reading
Ball & ring softening point (A. S.
T. M. D36–26) °F_____ Below 80° F.
Molecular weight average_____ 1090
Iodine No. Wijs method_____ 43
Carbon atoms per double bond
(avg.) _____ 42

This viscous oil precipitate was subjected to air blowing in a manner comparable to that set forth in illustration a above, with the exception that during the latter stages of the air blowing the temperature was caused to rise to approximately 520° F. and the air blowing was continued for approximately 15 hours. The resulting condensation product thus produced possessed the characteristics shown in the following table:

Visc. S. S. U. at 210° F____ Too viscous for ready determination
Penetration 100 g. total wt.
(A. S. T. M. D5–25)
cm.×10$^{-2}$ _____ 75
Ball & ring softening point
(A. S. T. M. D36–26) °F__ 147° F.
Molecular weight average__ 1990
Iodine No. Wijs method___ 33
Carbon atoms per double
bond (avg.) _____ 55

(d) The source material in this illustration constitutes a high molecular weight viscous material separated from propane precipitated wax by treatment of the wax with additional propane and precipitating the high molecular weight viscous hydrocarbons from the warm propane wax solution at a temperature of approximately 165° F. It has characteristics as follows:

Visc. S. S. U. at 210° F_____ 543
Penetration 100 g. total wt. (A. S.
T. M. D5–25) cm.×10$^{-2}$_____ Too soft to give a reading
Ball & ring softening point (A. S.
T. M. D36–26) °F_____ 106
Molecular wt. average_____ 1190
Iodine No. Wijs method_____ 35.9
Carbon atoms per double bond
(avg.) _____ 51

This viscous source material derived from wax was air blown in a manner comparable to that set forth under (a) above, with the exception that in the latter stages of the air blowing the temperature was caused to rise to approximately 570° F. and the blowing was continued for a period of approximately 22 hours, at which time the resulting product had characteristics as follows:

Visc. S. S. U. at 210° F_____ Too viscous for ready determination
Penetration 100 g. total wt. (A. S. T. M.
D5–25) cm.×10$^{-2}$_____ 41
Ball and ring softening point (A. S. T. M.
D36–26) °F_____ 315
Molecular wt. average_____ 2200
Iodine No. Wijs method_____ 35.2
Carbon atoms per double bond (avg.) _____ 52

From the foregoing illustration, it is apparent that Group 1 materials of a wide variety of specific characteristics may be obtained from a paraffin base oil stock for use in accordance with the present invention.

A typical high molecular weight naturally contained viscous precipitate separated from a warm propane solution of a paraffin base cylinder stock shows the following penetration characteristics:

Penetration (A. S. T. M. D5–25), cm.×10$^{-2}$

| Temp. °F.: | 100 g. total wt. |
|---|---|
| 30 | 86 |
| 40 | 174 |
| 50 | 206 |
| 60 | 302 |
| 70 | ... |

A typical condensation product condensed from naturally contained high molecular weight viscous materials precipitated from a warm propane solution of a paraffin base stock shows the following penetration characteristics:

*Penetration (A. S. T. M. D5-23), cm.×10⁻²*

| Temp., °F.: | 200 g. total wt. |
|---|---|
| 30 | 19 |
| 40 | 21 |
| 50 | 24 |
| 60 | 26 |
| 70 | 32 |
| 80 | 39 |
| 90 | 42 |
| 100 | 61 |

All of the materials of group 1 contemplated by the present invention are completely soluble in the non-polar solvents such as benzene, toluene, xylene, chloroform, carbon tetrachloride, and carbon disulfide.

The foregoing illustrations are exemplary of the products of group 1, contemplated for incorporation in the emulsions of the present invention.

The products of group 2, contemplated herein, are derived from the wax-free "bright stock" from which the viscous materials such as exemplified by the source materials of illustrations *a* and *c* above have been precipitated from a warm propane solution either before or after dewaxing.

The following illustrations of the production of materials of group 2, contemplated by the present invention, are given:

(*e*) A bright stock derived from a cylinder stock residue of a petroleum base oil that had been neither subjected to thermal decomposition or chemical change beyond that induced by ordinary atmospheric or vacuum distillation and representing a material from which naturally contained high molecular weight viscous products have been precipitated by warm propane solution, as herein above more specifically set forth, was subjected to solvent extraction with phenol to produce the extract of this illustration.

The bright stock had the following specifications:

| | |
|---|---|
| Visc. | 118.1 S. S. U. at 210° F. |
| Color—T. R. | 1 |
| A. P. I. gravity | 25.7 |
| Carbon residue per cent | 1.24 |
| Viscosity index | 95.0 |
| Pour point, °F. | |

This material was subjected to extraction with phenol containing approximately 10% water at the bottom of the tower. The extraction was conducted at a temperature of approximately 175° F. at the top of the tower and of about 100° F. at the bottom of the tower.

The extract produced from this extraction, and which is an exemplary material under group 2 contemplated herein, possessed the following characteristics:

| | |
|---|---|
| A. P. I. gravity | 9.8 |
| Visc. at 210° F. | 606.0 |
| Viscosity index | −240 |
| Refractive index $N_D^{20}$ | 1.5678 |

(*f*) A bright stock obtained by first propane dewaxing a cylinder stock such as set forth above, followed by precipitation of the high molecular weight viscous materials from a warm propane solution of the dewaxed cylinder stock, was solvent extracted with phenol. The bright stock of this illustration had the following characteristics:

| | |
|---|---|
| A. P. I. gravity | 25.6 |
| Flash | 550° F. |
| Fire | 610° F. |
| P. M. flash | 475° F. |
| Visc. S. S. U. at 210° F. | 132 |
| Viscosity index | 94.5 |
| Carbon residue percent | 1.22 |
| Pour point | 0° F. |

The phenol contained approximately 10% water at the bottom of the tower, and the tower was maintained at about 200° F. at the top and at approximately 140° F. at the bottom. The extract had the following characteristics:

| | |
|---|---|
| A. P. I. gravity | 8.9 |
| Visc. S. S. U. at 210° F. | 877 |
| Carbon residue percent | 1.85 |
| Viscosity index | −230 |
| Molecular weight | 525 |
| Iodine No. Wijs method | 67 |

The extracts under illustrations *e* and *f*, above, are exemplary of the materials contemplated under group 2, herein, though these extracts will vary somewhat depending upon the particular source materials and conditions of extraction.

The materials of group 3, contemplated herein, represent blends or mixtures of any of the foregoing materials of illustrations *a* to *f*, inclusive, as well as blends or mixtures of these materials with compatible substances such as drying oils, gilsonite, coal tar pitch, coumarone-indene resins, phenol-formaldehyde resins, chlorinated rubber and the like compatible materials.

The most satisfactory emulsifying and dispersing agents for use in producing the emulsions of the present invention, and those preferred, are: ammonium stearate, triethanolamine stearate, diethylcyclohexylamine lauryl sulfate.

Other satisfactory emulsifying agents are: ammonium oleate, triethanolamine oleate, ammonium linoleate, ammonium laurate, ammonium resinate (ammonium salt of wood rosin), calcium stearate, calcium resinate, sodium salt of naphthene sulfonic acid (commonly known as mahogany soap), lauryl pyridinium chloride, stearyl trimethyl ammonium bromide, diglycol laurate, and sodium stearate.

In general, the classes of materials which produce these emulsions are: cation active surface-active agents such as lauryl pyridinium bromide and stearyl trimethyl ammonium bromide; and certain anion active materials such as ammonium and ethanolamine salts of fatty acids containing 12 or more carbon atoms and of abietic acid (from rosin); in addition we have the compounds "mahogany soap" and diglycol laurate. Calcium stearate and resinate give water in oil emulsions rather than oil in water emulsions.

Combinations of the various enumerated agents may also be used in producing the emulsions of the present invention.

These emulsions may be prepared by any of the methods known to one versed in the art. For example, the selected material of any of the three groups hereinbefore described may be heated and poured into heated water with good agitation thereof. In some instances the heated water may be poured into the heated selected material. The emulsion prepared by this or similar procedure may be run thru an homogenizer or colloid mill, if desired, to obtain smaller and more uniform particle size of the dispersed phase.

In general, the water or water solution of the emulsifying agent is used at temperatures approaching the boiling point of water. The oil or resin phase which may contain the emulsifying agent, if desired, is used at elevated temperatures of the order of 200 to 300° F. (Elevated temperatures are used primarily for viscosity considerations and consequently may vary over a wide range.) Materials which are highly viscous at or above the boiling point of water, such as, for example, the condensation products of illustrations b, c and d, for the materials of group 1, described above, may be diluted with solvents such as xylene, or mineral spirits, to lower their viscosity and facilitate the preparation of the emulsion.

It is also possible, in accordance with the present invention, to produce the emulsifying agent in situ. This may be done by dissolving one component of the ultimate emulsifying agent in one of the separated phases and the other basic material of the emulsifying agent in the other phase and in thereafter uniting the phases. A typical instance of such practice is exemplified by dissolving stearic acid in the selected material to be emulsified and dissolving ammonia in the water phase. When the phases are mixed in the usual manner for preparing emulsions, ammonium stearate forms, producing requisite emulsifying agent.

Generally speaking, it is desired that the emulsions be prepared on the alkaline side of the pH scale; specifically, where ammonium salts are employed as the emulsifying agent, a slight excess of ammonium hydroxide insures the production of a more satisfactory emulsion.

Generally speaking, the emulsifying agent may be used in quantities varying from 1.0% to 20%, based on the non-aqueous phase with a preferred range of 3 to 20%. The more advantageous proportions will depend upon the materials being emulsified and, in particular, the emulsifying agent selected.

It is possible, in accordance with the present invention to prepare emulsions containing as high as 75% material in the dispersed phase. This is not necessarily the upper limit for the content of the dispersed phase, however, this limitation gives a highly viscous emulsion. The upper limit of the dispersed phase will, of course, be controlled by the viscosity desired for the emulsion being produced.

The following are typical examples for the preparation of emulsions in accordance with the present invention:

*Example 1*

| | Parts |
|---|---|
| Bright stock extract (per illustration f above) | 50 |
| Water | 50 |
| Ammonium stearate | 5 |

Ammonium stearate was dissolved in water at about 90° C. The bright stock extract was heated to 100° C. and was added to the water under good agitation. Stirring was continued until uniform particle size in the range of 2 to 4 microns diameter was obtained.

The resulting emulsion was light tan in color, fluid at room temperature, and quite stable.

*Example 2*

| | | |
|---|---|---|
| Bright stock extract (per illustration f above) | parts | 50 |
| Water | do | 50 |
| Stearic acid | do | 7 |
| Ammonium hydroxide (29% NH$_3$) | ml | 2.0 |

The stearic acid was dissolved in bright stock extract at 125° C. and added with good agitation to the water and ammonium hydroxide at 90° C. The resulting emulsion was similar to that of Example 1 with, however, a slightly higher viscosity.

*Example 3*

| | | |
|---|---|---|
| The chemical condensation product (per illustration b above) | parts | 33 |
| Mineral spirits | do | 33 |
| Water | do | 33 |
| Triethanolamine stearate | do | 3.3 |

The chemical condensation product was heated at about 140 to 150° C. and thinned with the mineral spirits. This solution was brought back to a temperature of 140 to 150° C. and added to the solution of triethanolamine in water at 85° C. under good agitation. The resulting emulsion was dark brown in color, fairly viscous at room temperature and readily diluted with water.

*Example 4*

| | | |
|---|---|---|
| The chemical condensation product (per illustration b above) | parts | 50 |
| Xylene | do | 25 |
| Water | do | 25 |
| Diethylcyclohexylamine lauryl sulfate | parts | 5 |

This emulsion was prepared as Example 3. It was dark brown in color, quite stiff at room temperature and readily diluted with water.

*Example 5*

| | | |
|---|---|---|
| The chemical condensation product (per illustration c above) | parts | 22 |
| The high molecular weight viscous source material (per illustration c above) | parts | 11 |
| Coal tar naphtha (boiling range 160 to 200° C.) | parts | 33 |
| Water | do | 33 |
| Lauryl pyridinium chloride | do | 6.5 |

This emulsion was prepared as Example 3. It was brown in color and fluid at room temperature.

*Example 6*

| | | |
|---|---|---|
| The chemical condensation product (per illustration b above) | parts | 27.5 |
| Gilsonite | do | 5.5 |
| Xylene | do | 33 |
| Water | do | 33 |
| Stearyl trimethyl ammonium bromide | parts | 3.3 |

This emulsion was prepared as Example 3. It was essentially black in color, fairly viscous and readily diluted with water.

*Example 7*

| | | |
|---|---|---|
| Bright stock extract (per illustration f above) | do | 50 |
| Water | do | 50 |
| Calcium stearate | do | 5 |

The calcium stearate was dissolved in the bright stock extract by heating to about 150° C. and this mixture added with vigorous stirring to water heated to 90° C. The resulting emulsion was quite viscous and was of the water in oil type, while all the previous examples were of the oil in water type.

Any of the foregoing emulsions may be blended together or blended with emulsions of other compatible materials, specifically, they may be blended with raw and synthetic rubber emulsions such as latex and neoprene.

Stabilizing and viscosity modifying agents may also be incorporated in the emulsions. Recognized stabilizing agents are casein, glue, blood albumen, and other soluble gums. Where a putrefactive emulsion or stabilizing agent is used, a suitable preservative may also be incorporated in the emulsion.

Various fillers such as pigments, wood flour, cellulosic materials, asbestos, clay, cork, and the like, may be incorporated in the emulsions when and as desired.

Emulsions prepared in accordance with the present invention are suited for a wide variety of uses and adaptations in the commercial arts. A blended emulsion formed by blending an emulsion of Example 1 with an emulsion of Example 3 yields a product that is well adapted as a corebinder in the production of cores for iron and steel casting. Suitably selected emulsions of the materials of groups 1, 2, and 3, and particularly those of group 3 which comprise combinations of the various materials of groups 1 and 2 with compatible substances, as hereinbefore described, are well adapted for use in coating compositions. As an illustration, the emulsions of Examples 3 and 6 are well suited as concrete paints and mastic coatings. When these emulsions are used in combination with suitable fillers, they provide excellent caulking compounds and materials for expansion joints in concrete roads. Other uses are for the impregnation of cloth, production of water-proof and insulating paper, adhesives for bonding plywood, paper, metals, and similar articles.

The following terms and expressions, as used in this specification and employed in the appended claims, are to be understood as having the definitions given below:

The term "hydrocarbon solvent" embraces those hydrocarbon solvents which are gaseous at normal temperature and which have from two to four carbon atoms per molecule.

The term "compatible substance" embraces drying oils, gilsonite, coal tar pitch, coumarone-indene resins, phenolformaldehyde resins, nitrocellulose, ethyl cellulose, and chlorinated rubber.

The term "a paraffin base oil" embraces crude oil which carries solid paraffin hydrocarbons and practically no asphalt.

The term "a high molecular weight viscous derivative of a residuum of a parafin base oil" embraces a derivative of a distillation residue such as a cylinder stock residue of a paraffin base oil containing substantially no more than 0.2% asphaltic-like materials by the Holde method.

Having thus disclosed the invention, what is claimed is:

1. An aqueous emulsion comprising as an essential ingredient a high molecular weight viscous derivative of a residuum of a paraffin base oil containing not substantially in excess of 0.2% asphaltic materials that has undergone no thermal decomposition or chemical change.

2. An aqueous emulsion comprising as an essential ingredient a chemically condensed high molecular weight viscous derivative of a residuum of a paraffin base oil containing not substantially in excess of 0.2% asphaltic materials that has undergone no thermal decomposition or chemical change.

3. An aqueous emulsion comprising as essential ingredients a high molecular weight viscous derivative of a residuum of a paraffin base oil containing not substantially in excess of 0.2% asphaltic materials that has undergone no thermal decomposition or chemical change and a chemical condensation product of said high molecular weight viscous derivative.

4. An aqueous emulsion comprising as an essential ingredient a solvent extract separated from a paraffin base oil product that has undergone no thermal decomposition or chemical change which has been previously dewaxed and from which the viscous high molecular weight materials precipitatable from a warm hydrocarbon solvent solution thereof at temperatures approximately 160° F. have been separated.

5. An aqueous emulsion characterized in that it contains in the dispersed phase a chemically condensed high molecular weight derivative of a residuum of a paraffin base oil that has undergone no thermal decomposition or chemical change and a compatible substance.

6. An aqueous emulsion comprising as an essential ingredient a solvent extract separated from a paraffin base oil product that has undergone no thermal decomposition or chemical change which has previously been dewaxed and from which the viscous high molecular weight materials precipitatable from a warm hydrocarbon solvent solution thereof at temperatures of approximately 160° F. have been separated and a chemically condensed high molecular weight viscous derivative of a residuum of a paraffin base oil containing not substantially in excess of 0.2% asphaltic materials that has undergone no thermal decomposition or chemical change.

7. An emulsion characterized in that it contains water in the dispersed phase and in the continuous phase a substance selected from the class consisting of a high molecular weight viscous derivative of a residuum of a paraffin base oil containing not substantially in excess of 0.2% asphaltic materials that has undergone no thermal decomposition or chemical change, a chemically condensed high molecular weight viscous derivative of a residuum of a paraffin base oil containing not substantially in excess of 0.2% asphaltic materials that has undergone no thermal decomposition or chemical change, a solvent extract separated from a paraffin base oil product that has undergone no thermal decomposition or chemical change which has been previously dewaxed and from which the viscous high molecular weight materials precipitatable from a warm hydrocarbon solvent solution thereof at temperatures approximately 160° F. have been separated.

8. An aqueous emulsion comprising as an essential ingredient a substance selected from the class consisting of a high molecular weight viscous derivative of a residuum of a paraffin base oil containing not substantially in excess of 0.2% asphaltic materials that has undergone no thermal decomposition or chemical change, a chemically condensed high molecular weight viscous derivative of a residuum of a paraffin base oil containing not substantially in excess of 0.2% asphaltic materials that has undergone no thermal decomposition or chemical change, a solvent extract separated from a paraffin base oil product that has undergone no thermal decomposition or chemical change which has been previously dewaxed and from which the viscous high molecular weight materials precipitatable from a warm hydrocarbon solvent solution thereof at temperatures approximately 160° F. have been separated and a solvent for such substances.

9. An aqueous emulsion comprising as an essential ingredient a chemically condensed high molecular weight viscous hydrocarbon material that has been precipitated from a warm solution of a paraffin base residual oil in a hydrocarbon solvent having from 2 to 4 carbon atoms per molecule while at a temperature of approximately 160° F.

10. An aqueous emulsion comprising as an essential ingredient an admixture of a high molecular weight viscous hydrocarbon material that has been precipitated from a warm solution of a paraffin base residual oil in a hydrocarbon solvent having from 2 to 4 carbon atoms per molecule at a temperature of approximately 165° F. and a chemical condensation product of such high molecular weight viscous derivative.

11. An aqueous emulsion comprising as an essential ingredient an admixture of a high molecular weight viscous hydrocarbon material that has been precipitated from a warm solution of a paraffin base residual oil in a hydrocarbon solvent having from 2 to 4 carbon atoms per molecule at a temperature of approximately 165° F. and a solvent extract of the paraffin base oil product from which said high molecular weight viscous derivative has been previously precipitated.

RICHARD S. SHUTT.
ELLSWORTH E. McSWEENEY.